United States Patent
Stallman et al.

(10) Patent No.: US 7,885,919 B2
(45) Date of Patent: *Feb. 8, 2011

(54) JOURNALING DATABASE CHANGES USING MINIMIZED JOURNAL ENTRIES THAT MAY BE OUTPUT IN HUMAN-READABLE FORM

(75) Inventors: Adam Thomas Stallman, Rochester, MN (US); Larry William Youngren, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 462 days.

This patent is subject to a terminal disclaimer.

(21) Appl. No.: 12/109,027

(22) Filed: Apr. 24, 2008

(65) Prior Publication Data

US 2008/0222220 A1  Sep. 11, 2008

Related U.S. Application Data

(63) Continuation of application No. 11/291,582, filed on Dec. 1, 2005, now Pat. No. 7,574,460.

(51) Int. Cl.
*G06F 7/00* (2006.01)
*G06F 17/00* (2006.01)

(52) U.S. Cl. ........................ 707/604; 707/648

(58) Field of Classification Search .............. None
See application file for complete search history.

(56) References Cited

U.S. PATENT DOCUMENTS

| | | | |
|---|---|---|---|
| 5,280,612 | A | 1/1994 | Lorie et al. |
| 6,341,287 | B1 | 1/2002 | Sziklai et al. |
| 6,968,349 | B2 | 11/2005 | Owen et al. |
| 2002/0026339 | A1 | 2/2002 | Frankland et al. |
| 2003/0217031 | A1 | 11/2003 | Owen et al. |
| 2005/0021571 | A1 | 1/2005 | East |
| 2005/0066235 | A1 | 3/2005 | Lange-Last |
| 2005/0251540 | A1 | 11/2005 | Sim-Tang |
| 2006/0129618 | A1 | 6/2006 | Maier |

*Primary Examiner*—Khanh B. Pham
*Assistant Examiner*—Azam Cheema
(74) *Attorney, Agent, or Firm*—Martin & Associates, LLC; Derek P. Martin

(57) ABSTRACT

A minimized journaling mechanism stores minimized journal data in a format that allows for display and outputting the journal data in human-readable form. When a change to a record occurs, instead of writing only the changed bytes, all of the bytes in each field that changed are written to the journal, along with all of the bytes in each field selected to be always journaled. A default object is created with default data in all of the fields. When the journal entry needs to be output in human-readable form, the default object is read, and the minimized journal entry is then overlaid on the default object. The result is an object that contains default data in all non-selected fields that were not changed, with the journal data in all fields and that did change and in all fields that were selected to always be journaled.

2 Claims, 6 Drawing Sheets update Product_Table set Quantity = Quantity - 1 where ProdID = 1001

| ProdID (primary key) | Description | Quantity | Cost | Product_Picture |
|---|---|---|---|---|
| 1001 | red stapler | 1104 | 8.98 | 50K JPEG data |

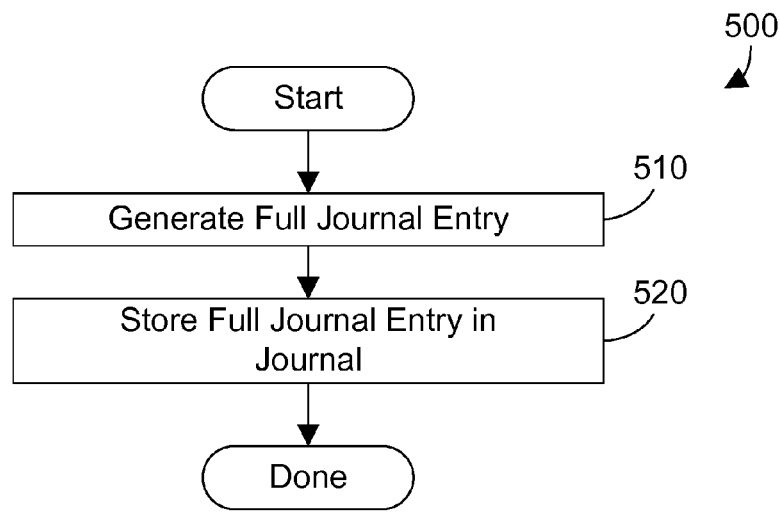
FIG. 5    Prior Art
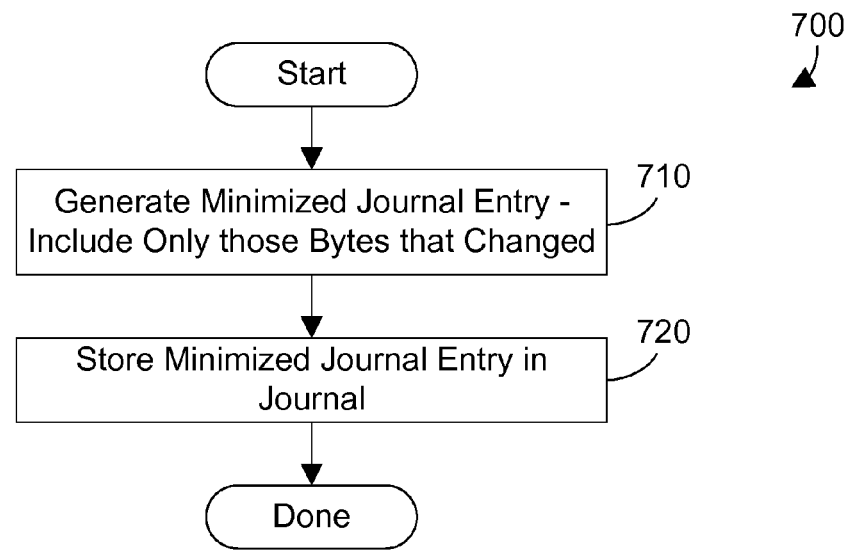
FIG. 6    Prior Art
FIG. 7    Prior Art

| | Record # | Change Offset (bytes) | Length of Change (bytes) | Changed Data (in hex) |
|---|---|---|---|---|
| After | 2 | 35 | 1 | 50 |

Before - Not human-readable

After - Not human-readable

| | Record # | Change Offset (bytes) | Length of Change (bytes) | Changed Data (in hex) | |
|---|---|---|---|---|---|
| After | 2 | 0 | 8 | 00000000000003E9 | — 1020 |
| | | 28 | 8 | 0000000000000450 | — 1030 |

JOURNALING DATABASE CHANGES USING MINIMIZED JOURNAL ENTRIES THAT MAY BE OUTPUT IN HUMAN-READABLE FORM

CROSS-REFERENCE TO PARENT APPLICATION

This patent application is a continuation of a patent application with the same title, U.S. Ser. No. 11/291,582 filed on Dec. 1, 2005, which is incorporated herein by reference.

BACKGROUND OF THE INVENTION

1. Technical Field

This invention generally relates to computer systems, and more specifically relates to journaling changes in a database.

2. Background Art

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Database systems typically include a database manager that assures the integrity of the database as changes to the database are made. The database manager typically records changes to a database in a journal. The journal allows changes to the database to be rolled back if needed. In addition, a journal may be used to replicate a database by applying the journaled changes to a remote database in the same order the journaled changes were made to the original database.

Most database managers known in the art record all bytes in a record into a log when a change is made to the record, including bytes in the record that do not change. Because recording data that has not changed takes valuable space and time in a database journal, a newer concept known as minimized data journaling was introduced. With a minimized data journal, only the changed bytes of a record are recorded without respect to field boundaries, which assumes that the bytes in the record that are not represented in the journal entry did not change. A minimized data journal is generally likely to achieve significantly better performance than a full data journal. Note, however, that this increase in performance comes at a usability cost.

Because a journal entry in a minimized data journal only includes the bytes that changed, the resulting journal entry is in a compressed format that may no longer be easily read, understood, and recognized by a human or auditing program. While this is not a concern in some settings, it may be a significant concern in other settings that require auditing, debugging, or human viewing of database changes. To perform an audit, a human auditor or auditing program typically compares the full image of the record before the change to a full image of the record after the change. The human auditor or auditing program thus expects to see the full record in performing the audit. Without a full record image, sensing the identity of the record (e.g., John Doe's bank account #12345), lining up the matching fields among the set of data collected, and recognizing field boundaries is made very difficult and does not constitute a friendly human interface. Because most minimized data journal entries do not contain the full record, nor even full fields, the resulting encoded data is not human-readable. For the purposes herein, the term "human-readable" means a format that does not portray an internal encoded representation of the changes, but rather a representation of the changes in full record layout with no partially represented fields. The data represented in this manner allows a human auditor or auditing program to easily discern the change that took place and is displayed in a manner consistent with using full journal data. For this reason, minimized data journals have generally not been used in environments that require auditing. As a result, environments that require auditing or occasional debugging based on the journal have not benefitted from the performance increase provided by minimized data journals. Without a way to provide minimized journal data that may be output in human-readable form, the computer industry will be left with the undesirable choice between higher performance systems that use minimized journal data but cannot be easily audited, or lower performance systems that use full journal data that can be audited. Neither of these choices is desirable when both high performance and auditing is required.

DISCLOSURE OF INVENTION

According to the preferred embodiments, a minimized journaling mechanism stores minimized journal data in a format that allows for display and outputting the journal data in human-readable form that may be easily read and recognized by an auditor. When a change to a record occurs, instead of writing only the changed bytes, all of the bytes in each field that changed are written to the journal, along with all of the bytes in each field selected to be always journaled. Fields in neither of these categories are not captured. A default object is created with default data in all of the fields. When the journal entry needs to be output in human-readable form, the default object is read, and the minimized journal entry is then overlaid on the default object. The result is an object that contains default data in all non-selected fields that were not changed, with the journal data in all fields and that did change and in all fields that were selected to always be journaled. In this manner the preferred embodiments provide the benefits of minimized journal data while still providing for the ability to audit from the journal.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 5 is a flow diagram of a prior art method for generating and storing full journal entries;

FIG. 6 is a sample display showing the record of FIGS. 2 and 4 in human-readable form;

FIG. 7 is a flow diagram of a prior art method for generating and storing minimized journal entries;

BEST MODE FOR CARRYING OUT THE INVENTION

The preferred embodiments provide minimized journal data in human-readable form. This is accomplished by writing all data in each field that was changed, and in each field that is specifically selected for journaling, to the journal. A default object with default values in each field is also saved to the journal. When a journal entry needs to be output in human-readable form, the corresponding default object is read, the minimized journal entry is read, and the data from the minimized journal entry is overlaid on the default object. The result is a record that contains all the original fields, with data in all fields that changed and in all fields that were selected for journaling, and an indication of default data in the fields that did not change and were not selected for journaling. This record is human-readable, even though it contains minimized journal data. The preferred embodiments thus provide the best of both worlds: significantly improved performance due to minimizing journal data collection while providing the ability to audit the journal data due to the ability to output the minimized journal data in a human-readable form.

Figure 1:
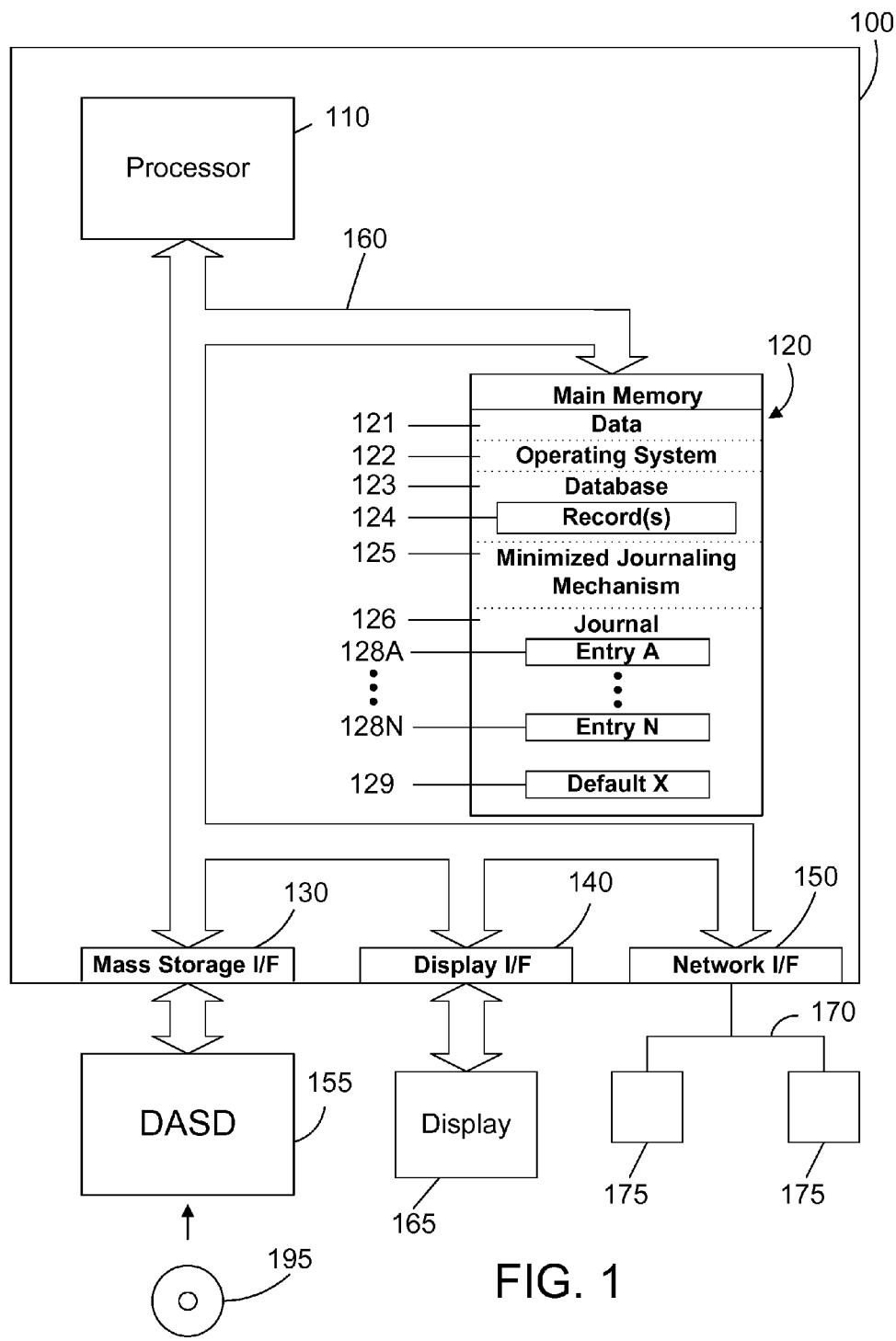
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, a database 123, a minimized journaling mechanism 125, and a journal 126. Data 121 represents any data that serves as input to or output from any program in computer system 100. Operating system 122 is a multitasking operating system known in the industry as i5/OS; however, those skilled in the art will appreciate that the spirit and scope of the present invention is not limited to any one operating system. Database 123 is any suitable database, whether currently known or developed in the future. Database 123 comprises one or more records 124 that contain fields of data. Minimized journaling mechanism 125 suitably generates journal entries in the journal 126. The individual entries in FIG. 1 are shown as 128A, ..., 128N. The minimized journaling mechanism 125 stores the journal entries 128A, ..., 128N in the journal 126 in a format that allows the journal entries to be later output in a human-readable form. This is possible by also storing in the journal 126 a default object 129 for each object instance with entries stored in the journal 126. By storing a default object and the minimized journal entries in accordance with the preferred embodiments, a human-readable form may be output by overlaying the default object with the data in a minimized journal entry for the object. The result is an output that shows actual data in all fields that changed and in all fields that were selected for journaling, with default data in all non-selected fields that did not change. In this manner, the minimized journaling mechanism 125 succeeds in providing the significant performance benefits of minimized journal data while still allowing the journal to be easily audited.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, minimized journaling mechanism 125, and journal 126 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiments each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links. Note that the preferred signal bearing media is tangible.

Figures 2, 3, 4:
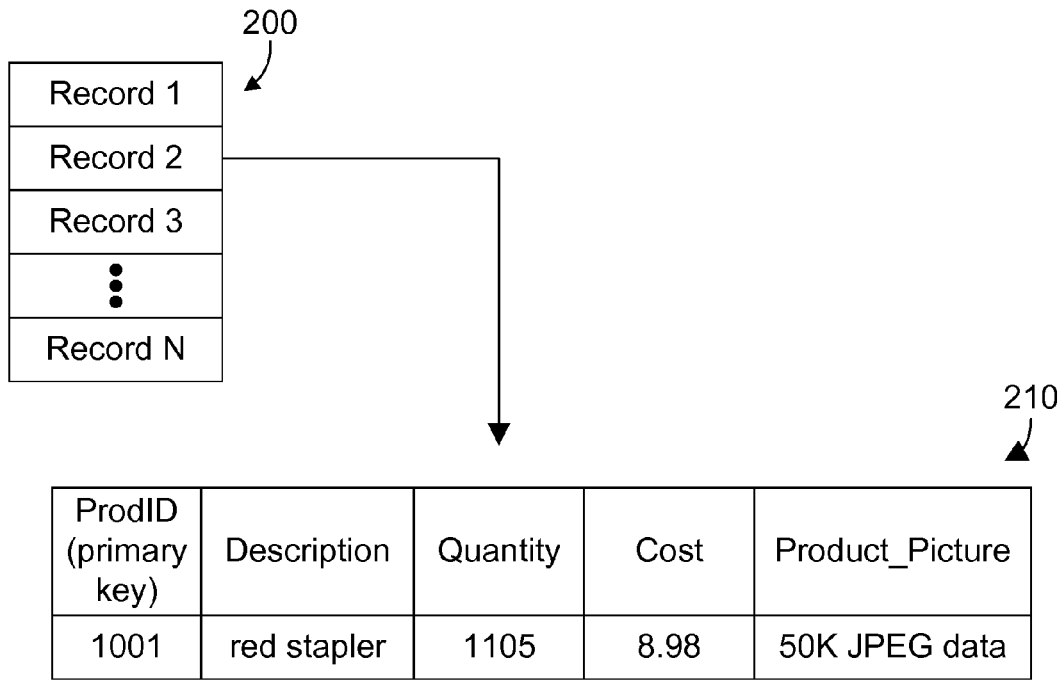
FIG. 2 is a block diagram showing details of a record in a sample prior art database table.
FIG. 3 is a statement in structured query language (SQL) for updating the record shown in FIG. 2.
FIG. 4 is a block diagram of the record in FIG. 2 after applying the update statement in FIG. 3.

A simple example is now presented to compare and contrast the prior art methods for journaling and the method of the preferred embodiments, which is preferably performed by the minimized journaling mechanism 125 in FIG. 1. Referring to FIG. 2, a sample database table 200 includes multiple records as shown. The second record is shown as record 210 below the database table 200. Table 200 includes five fields or columns, namely: ProdID, which is a primary key based on a product identifier; Description, which describes the item corresponding to the record; Quantity, which shows the number of the items in inventory; Cost, which shows the cost in U.S. dollars for the item; and Product_Picture, which contains a digital image of the item. These fields and their values for Record 2 are shown in FIG. 2.

We now assume an update operation needs to be performed on Record 2 in FIG. 2. A sample update operation is shown in FIG. 3, and represents an SQL statement that reduces the quantity of the item by one. This update could be used, for example, when one of the items is sold. Note the where clause in FIG. 3 specifies that ProdID=1001, which corresponds to record 210 shown in FIG. 2, because ProdID is a primary (i.e., unique) key in the table 200. After the update statement in FIG. 3 is executed, record 210 is as shown in FIG. 4, with the Quantity field reduced by one. While an update statement is shown in FIG. 3, this is shown as one specific example of a known way to make a change to a database table. The preferred embodiments expressly extend to any suitable way for changing data in a database table, whether currently known or developed in the future.

There are different ways in the art for the change in Record 2 from FIG. 2 to FIG. 4 caused by executing the update statement in FIG. 3 to be journaled. The first method considered is full data journaling, represented by method 500 in FIG. 5. In a full data journaling context, all data in a record is written to the journal. Thus, a full journal entry for the record in FIG. 4 will include all of the data shown in FIG. 4, even though only the Quantity field changed. A full journal entry is first generated that includes all of the fields and data shown in FIG. 4 (step 510). The full journal entry is then stored in the journal (step 520). The problem with the prior art method for full journaling shown in FIG. 5 is that all of the data shown in FIG. 4 is stored to the journal, including the 50K JPEG data for the picture of the product. Needless to say, storing the product picture in each journal entry for the table 200 results in huge storage requirements for the journal, and significantly reduces the performance of the journal. An additional performance penalty is evident when considering the use of the journal entries in a replication environment. In such environments, the journal entry data is sent across a communication channel to a secondary system and used to update a replica instance of the database tables. The increased overhead within the communication channel is apparent when considering the transmission of the 50K JPEG data time and time again when only the Quantity field is modified.

One advantage of the prior art full journaling shown in method 500 in FIG. 5 is that the journal may be audited because the journal entries may be easily output in human-readable form. FIG. 6 shows output from the journal before the update operation in FIG. 3 is executed and after the update operation in FIG. 3 is executed. Because the full journal data is in human-readable form, it can be audited. However, this ability to audit the data comes at the expense of significant performance penalties that arise from having to store all fields in a record each time any of the fields are changed.

Figures 8, 9, 10, 11:
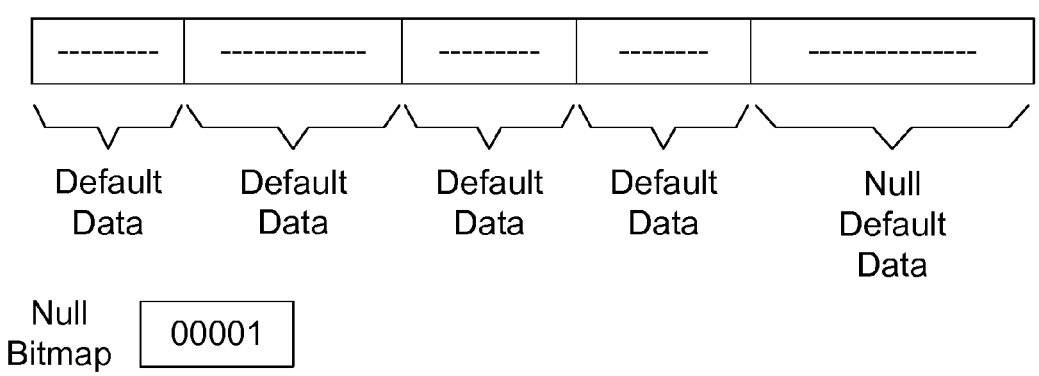
FIG. 8 is a block diagram of a prior art minimized journal entry that represents the changes to the record in FIG. 2 after applying the update statement in FIG. 3.
FIG. 9 shows that neither the before or after representation of the record is human-readable using the prior art minimized journal entries.
FIG. 10 is a block diagram of a minimized journal entry that is eligible to become human-readable in accordance with the preferred embodiments.
FIG. 11 is a block diagram of a default object for the database table 200 in FIG. 2 in accordance with the preferred embodiments.

Due to the significant performance penalty that results from full journaling, a different method was developed to only write the bytes in a record that changed to the journal. This is known in the art as minimized data journaling, which is done without regard to field boundaries. Referring to FIG. 7, a prior art method 700 for minimized data journaling begins by generating a minimized journal entry that only includes the bytes in the record that changed (step 710). The minimized journal entry may then be stored in the journal (step 720). One sample implementation for a minimized journal entry for the record in FIG. 2 after applying the update in FIG. 3 is shown in FIG. 8. The format of known minimized journal entries may be complicated by the fact that the internal data representation of the journal entry differs from the external representation for some field types, and because of the different methods of handling variable length data within the database representation. The prior art example journal entry 810 in FIG. 8 is simplified for the purpose of illustration. The minimized journal entry 810 includes a record number field, in addition to a set of data for each changed section of the record including a change offset field, a length of change field, and a changed data field. The record number field identifies the record number in the database table that was changed. The change offset field assumes 8 byte integer values for the ProdID and Quantity fields and a 20 byte Description field, so the byte offset from the beginning of the record to the changed byte is 8+20+7=35. The changed quantity is from decimal 1105 (hex 451) to decimal 1104 (hex 450). Because only one byte changed, only the last byte (hex 50) is recorded in the minimized journal entry. By writing only those bytes that changed to the journal entry, the minimized journal mechanism of the prior art achieves a significant improvement in journal performance and space consumption because the non-changed data, including the 50K JPEG data, need not be written to the journal. Note, however, that this improvement in performance comes at the cost of not being able to audit the journal. As shown in FIG. 9, the journal data cannot be easily output in human-readable form. Humans expect to see full fields and readily recognize database field boundaries. As a result, it is very difficult or impossible to audit the journal where minimized journal data is stored, especially if the journal being analyzed resides on a different machine than the one housing the original database table.

The preferred embodiments solve the problem of not being able to audit minimized journal data while still providing nearly all of the advantages of minimized data journaling. In the preferred embodiments, a minimized journal entry 1010 shown in FIG. 10 is created. We assume the user or system has selected the ProdID field to be always journaled. A user would likely select this field such that the identity of the record is easily recognizable by auditors. As a result, the journal entry 1010 includes a first portion 1020 that records the full 8 bytes in the ProdID field, and a second portion 1030 that records the full 8 bytes in the Quantity field, because the Quantity field changed. Instead of only storing the bytes that changed, there are two types of information that is stored in the journal entry: 1) all of the data in each field that had any changes; and 2) all of the data in each field that is selected to always be journaled. In table 200 in FIG. 2, the ProdID field is a key field. We assume a user or system specifies that the ProdID field always be journaled so an auditor may easily recognize the record. As a result, the minimized journal entry 1010 of the preferred embodiments includes the data for the ProdID field at 1020 because it is a selected field that is always journaled, and also includes all of the data in the Quantity field at 1030 because it changed. Note that the minimized journal entry 1010 shown in FIG. 10 includes eight bytes of data for the selected ProdID field, and includes eight bytes of data for the entire changed field Quantity, which requires slightly more storage than the prior art minimized journal entry 810 shown in FIG. 8. This small addition of data, however, allows the journal entry 1010 to be output in human-readable form that supports auditing of the journal.

When the minimized journal entry 1010 is stored to the journal, the minimized journal mechanism (e.g., 125 in FIG. 1) checks to see if the journal already contains the current default object for the table. If not, the current default object is stored in the journal. Note that a default object is not needed for each individual entry in the journal, but only for each object instance with entries stored in the journal. Thus, for all the records in database table 200 shown in FIG. 2, a single default object 1100 as shown in FIG. 11 is stored in the journal. Thus, if a journal contains 25,000 journal entries from four different database tables, only four corresponding default objects will need to be stored in the journal.

Figure 12:
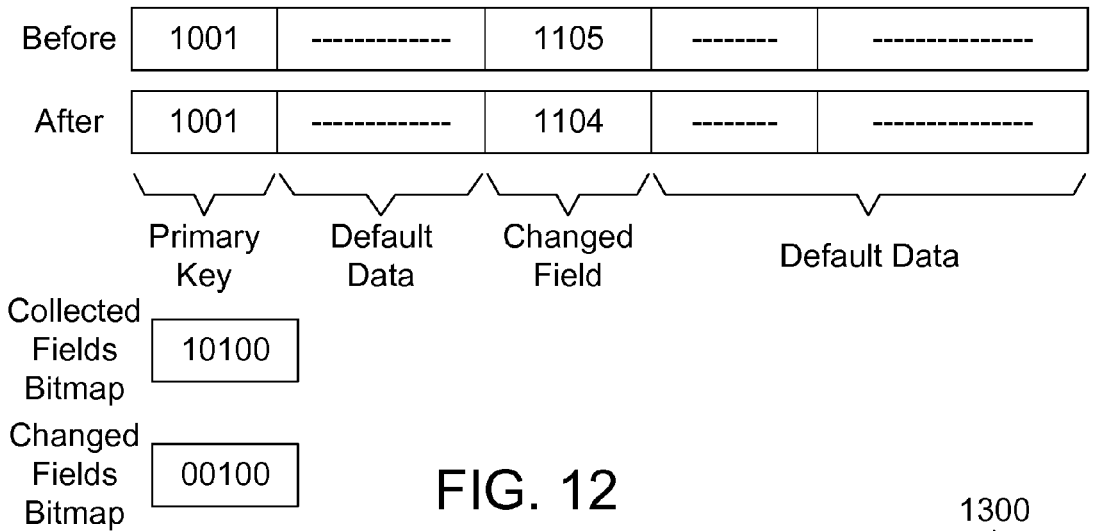
FIG. 12 is a sample display of the records of FIGS. 2 and 4 in human-readable form using the minimized journal data in FIG. 10 in accordance with the preferred embodiments.

As shown in FIG. 11, the default object 1100 includes default data in all of the fields. Default data may be any suitable bit pattern. In the preferred embodiments, the default data includes both a bit pattern referred to as a "null bitmap" to indicate which of the default fields are null, and a default value for each of the non-null fields. The null bitmap in FIG. 11 has zeroes in the first four bits and a one in the fifth bit, representing that the Product Picture field is null. The default data is represented in FIG. 11 as dashes. When the minimized journal entry 1010 needs to be output in human-readable form, the default object 1100 is read, and the journal data is then overlaid on a copy of the default object. The result is an object with all of the fields, as shown in FIG. 12, with the fields that changed containing data, while the fields that did not change are represented with default data as well as an identifier shown in FIG. 12 as a "collected fields bitmap" to indicate the default data is representative of a field for which data was not collected. The five bits in the collected fields bitmap in FIG. 12 correspond to the five fields in the database table in FIG. 2, with a one bit indicating the corresponding field was collected and a zero bit indicating the corresponding field was not collected. The collected fields bitmap 12 shown in FIG. 12 has a value of 10100, which indicates that the first and third fields contain valid data, while the second, fourth and fifth fields were neither changed nor identified as critical fields that always get collected. This is an easy and effective way to distinguish between true default data and actual data that may have the same value as the default data. An additional structure shown in FIG. 12 is the "changed fields bitmap" is similarly used as an easy and effective way to determine which fields were changed by the database operation resulting in the journal entry. The one bit indicates a corresponding field was changed and a zero bit indicates the corresponding field did not change. The dashes in FIG. 12 represent the fields that still contain default data, i.e., that were not changed. Note that the minimized journal entry 1010 shown in FIG. 10 may be output in human-readable form, as shown in FIG. 12. As a result, the minimized journal of the preferred embodiments provide almost all of the advantages of minimized data journaling in the prior art while still allowing auditing.

Figure 13:
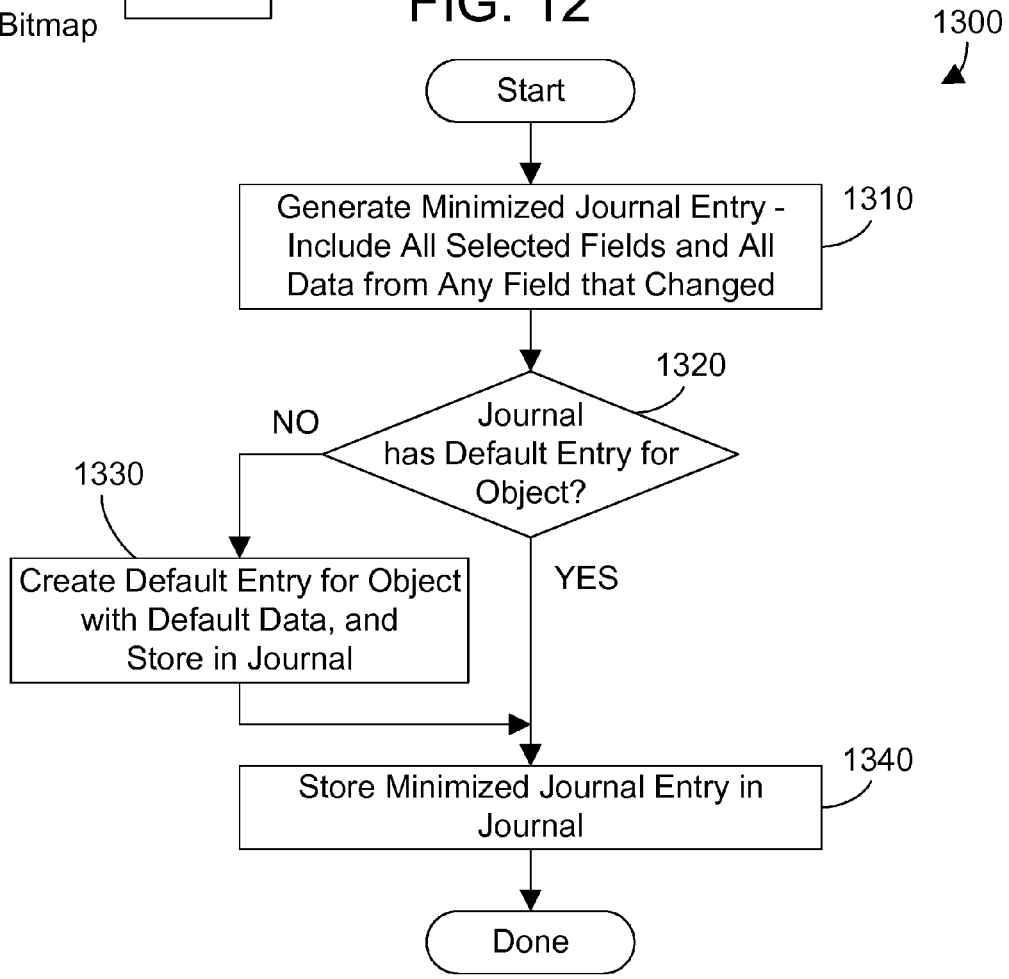
FIG. 13 is a flow diagram of a method for generating and storing minimized journal data in accordance with the preferred embodiments.

Referring to FIG. 13, a method 1300 in accordance with the preferred embodiments shows the steps that the minimized journaling mechanism (e.g., 125 in FIG. 1) performs when writing to the journal. First, a minimized journal entry is created that includes all fields that are specified to be always journaled and all data from any field that changed (step 1310). Bitmaps (e.g., the collected fields bitmap and the changed fields bitmap in FIG. 12) are also constructed at this time and included in the entry to indicate which fields of the record were journaled and which fields of the record were changed. If the journal does not already have a default entry for the object that corresponds to the journal entry (step 1320=NO), a default entry for the object is created with default data, and the default entry is stored in the journal (step 1330). The minimized journal entry is then stored in the journal (step 1340). Note that if the journal already contains a default entry for the object corresponding to the journal entry (step 1320=YES), the minimized journal entry may be stored in the journal (step 1340) without the creation of a new default entry.

Method 1300 in FIG. 13 shows storing all selected fields and all changed fields to the minimized journal entry. Thus, a user may specify which fields are always stored in the journal, while the rest of the fields are eligible for minimization. Of course, in an alternative embodiment, some fields could be always stored based on their characteristics. For example, key fields could be automatically always journaled in accordance with the preferred embodiments.

Figure 14:
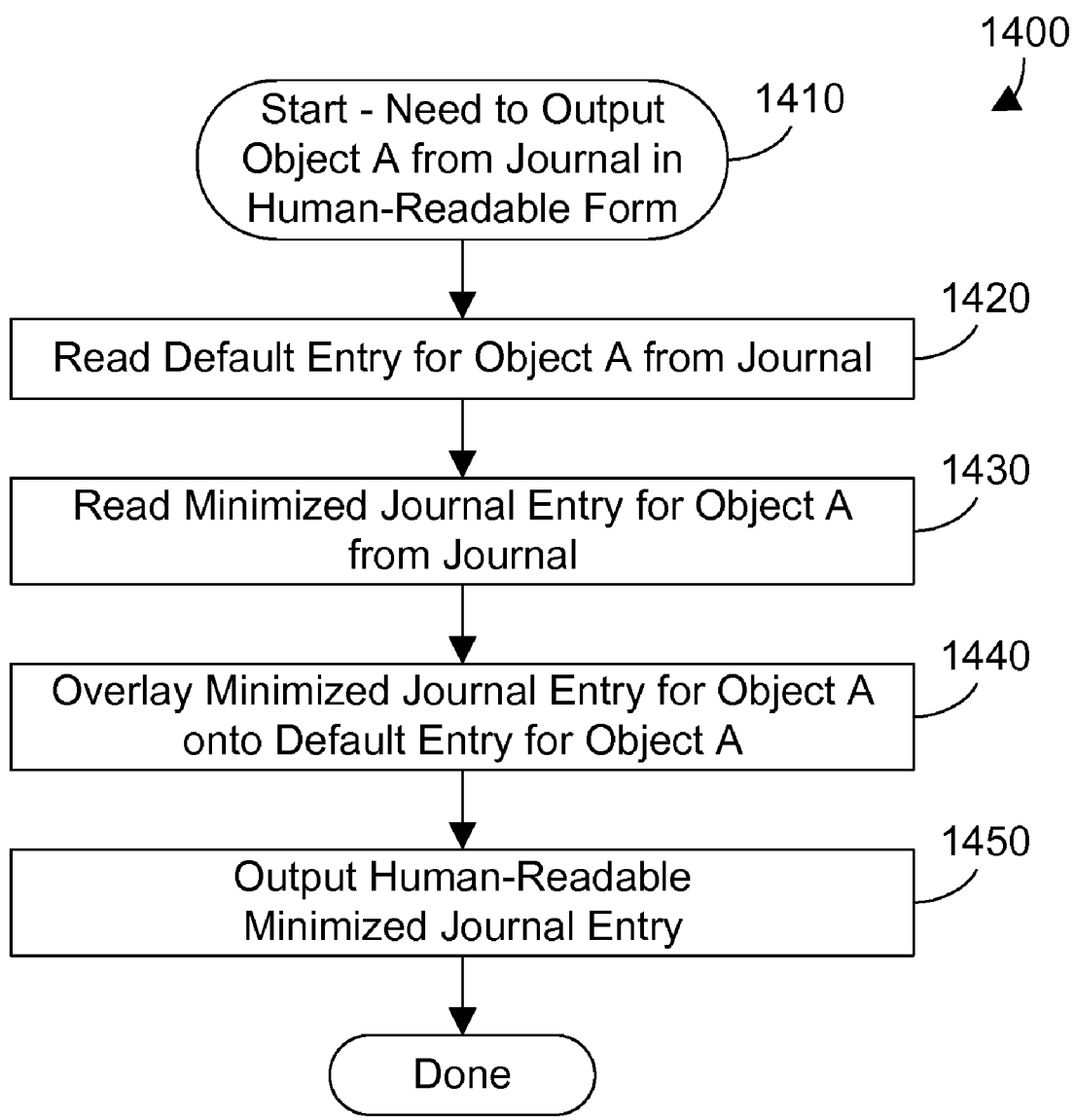
FIG. 14 is a flow diagram of a method for outputting minimized journal data in human-readable form in accordance with the preferred embodiments.

Referring to FIG. 14, a method 1400 in accordance with the preferred embodiments shows the steps that the minimized journaling mechanism (e.g., 125 in FIG. 1) performs when outputting a minimized journal entry in human-readable form. Method 1400 begins when a journal entry on behalf of object A needs to be output from the journal in human-readable form (step 1410). The default entry for Object A is read from the journal (step 1420). The minimized journal entry for Object A is read from the journal (step 1430). The minimized journal entry for Object A is then overlaid onto the default entry for Object A (step 1440). Overlaying the minimized journal entry onto the default entry for Object A leaves default data in all fields that are not affected by the minimized journal entry, while writing data in the minimized journal entry to all fields that were selected to always be journaled and to all changed fields. The result is a full database record with default data in all non-selected fields that did not change, and actual data in the selected fields and in the fields that did change, as shown in FIG. 12. As a result, the minimized journal entry may now be output in human-readable form (step 1450). As method 1400 shows, the minimized journal entry is not human-readable until it is overlaid on a default object that corresponds to the minimized journal entry. The resulting object is human-readable, and may then be output.

The preferred embodiments provide significant advantages over the prior art. By storing only slightly more data in the journal than the prior art does during minimized data journaling, almost all of the performance benefits of minimized data journaling are realized in the preferred embodiments, while still providing an output in human-readable form that allows for auditing the journal. The result is the best of both worlds—high performance from minimizing the data stored, while still allowing auditing.

Not all users of the stored journal information will need full auditing and human recognizable capabilities. One of the advantages of this approach is that both uses are readily available. That is, just because the record change was captured in a minimized entry representation does not mandate that it be re-expanded into a human-readable representation at the time it is displayed to a user. The preferred embodiments disclose storing a minimized journal entry in the journal in a first format, and outputting the minimized journal entry in either this first internal format or human-readable form in a second format. Providing these two different formats provides great flexibility. For example, the first format could be used to replicate the database to a remote system thereby assuring reduced transmission volumes, while the second human-readable format can be used for auditing or debugging purposes. The two different formats allow the minimized journal mechanism of the preferred embodiments to serve both the human auditor and the machine-driven replay for replication with equal ease without mandating that two different instances be captured and stored.

One advantage of the preferred embodiments is that the journal alone contains all of the necessary data to display the human-readable form of the minimized journal entry. That is, the related database table being audited or debugged need not even exist on the system used by the auditor to view the journal entries. This is accomplished by storing the default objects in the journal as well. This makes the journal independently able to display the journal entries. As a consequence, a journal may be saved to media or sent remotely to a secondary system with the assurance that the journal contains the complete audit record. This is especially attractive in an auditing environment where the journal can be easily archived or transferred to a second system for analysis.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

The invention claimed is:

1. An apparatus comprising:
   at least one processor;
   a memory coupled to the at least one processor;
   a database residing in the memory, the database comprising a plurality of records; and
   a journaling mechanism residing in the memory and executed by the at least one processor, the journaling mechanism storing an entry in a journal when a record in the database changes, the entry including all data from all fields in the record that changed, the entry including all data from any selected fields that are always to be journaled, wherein the selected fields are selected by a user specifying a type, wherein all fields of the specified type are included in the selected fields, the entry excluding all data from all non-selected fields in the record that did not change, wherein the journaling mechanism determines whether a default object corresponding to the entry is already stored in the journal, wherein the default object includes default data for each field in the object, and if there is no default object corresponding to the entry already stored in the journal, storing the default object corresponding to the entry in the journal, wherein the entry includes a collected fields bitmap that indicates which fields in the entry were collected and which fields were not collected in the entry and a changed fields bitmap that indicates which fields in the entry were changed and which fields in the entry were not changed, wherein the entry is output by the journaling mechanism in human-readable form by the journaling mechanism reading the default object, reading the entry, overlaying the data from the entry onto the default object, and outputting the overlaid object, wherein the human-readable form of the overlaid object is displayed to a user, wherein data for all selected fields and all fields changed are displayed to the user, and wherein the default data is represented as data that did not change in the display of the human-readable form of the overlaid object.

2. A computer-readable program product comprising:
   a journaling mechanism that stores an entry in a journal when a record in a database changes, the entry including all data from all fields in the record that changed, the entry including all data from any selected fields that are always to be journaled, wherein the selected fields are selected by a user specifying a type, wherein all fields of the specified type are included in the selected fields, the entry excluding all data from all non-selected fields in the record that did not change, wherein the journaling mechanism determines whether a default object corresponding to the entry is already stored in the journal, wherein the default object includes default data for each field in the object, and if there is no default object corresponding to the entry already stored in the journal, storing the default object corresponding to the entry in the journal, wherein the entry includes a collected fields bitmap that indicates which fields in the entry were collected and which fields were not collected in the entry and a changed fields bitmap that indicates which fields in the entry were changed and which fields in the entry were not changed, wherein the entry is output by the journaling mechanism in human-readable form by the journaling mechanism reading the default object, reading the entry, overlaying the data from the entry onto the default object, and outputting the overlaid object, wherein the human-readable form of the overlaid object is displayed to a user, wherein data for all selected fields and all fields that changed are displayed to the user, and wherein the default data is represented as data that did not change in the display of the human-readable form of the overlaid object; and
   recordable media bearing the journaling mechanism.

* * * * *